US007383507B2

(12) United States Patent
Shibamiya et al.

(10) Patent No.: US 7,383,507 B2
(45) Date of Patent: Jun. 3, 2008

(54) DISPLAY APPARATUS AND REMOTE CONTROL APPARATUS

(75) Inventors: Yoshikazu Shibamiya, Tokyo (JP); Shigeki Mori, Saitama (JP); Yuichi Matsumoto, Kanagawa (JP); Masaki Kutsuna, Kanagawa (JP); Tetsu Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 10/712,061

(22) Filed: Nov. 14, 2003

(65) Prior Publication Data

US 2004/0095316 A1    May 20, 2004

(30) Foreign Application Priority Data

Nov. 19, 2002  (JP) ............................. 2002/335100
Oct. 27, 2003  (JP) ............................. 2003/365934

(51) Int. Cl.
*G06F 17/21* (2006.01)
(52) U.S. Cl. .................................................. 715/721
(58) Field of Classification Search ................ 348/734, 348/14.05, 106; 725/139, 32; 362/253; 463/41, 20, 31, 36–39; 248/127; 340/588, 340/825; 398/106
See application file for complete search history.

(56) References Cited

U.S. PATENT DOCUMENTS

| 4,959,719 | A  | * | 9/1990  | Strubbe et al. ............. 348/565 |
| 5,715,020 | A  | * | 2/1998  | Kuroiwa et al. ............ 348/734 |
| 6,359,661 | B1 | * | 3/2002  | Nickum ..................... 348/734 |
| 6,489,986 | B1 | * | 12/2002 | Allen ....................... 348/14.01 |
| 6,493,008 | B1 |   | 12/2002 | Yui .......................... 345/840 |
| 6,579,184 | B1 | * | 6/2003  | Tanskanen .................. 463/41 |
| 6,697,124 | B2 | * | 2/2004  | Dimitrova et al. .......... 348/565 |
| 7,044,619 | B2 | * | 5/2006  | Sanderlin et al. ........... 362/253 |
| 7,111,320 | B1 | * | 9/2006  | Novak ....................... 725/139 |
| 2002/0133815 | A1 |   | 9/2002  | Mizutome et al. ............. 725/9 |
| 2004/0262464 | A1 | * | 12/2004 | Sanderlin et al. ........... 248/127 |
| 2005/0005288 | A1 | * | 1/2005  | Novak ....................... 725/32 |
| 2006/0159507 | A1 | * | 7/2006  | Jawerth et al. ............. 400/472 |

FOREIGN PATENT DOCUMENTS

JP    2000-305543 A    11/2000
JP    2003-032573      1/2003

OTHER PUBLICATIONS

"Golden Eye: 007," Nintendo Entertainment Systems; Aug. 25, 1997; http://gamefreaks365.com/review.php?artid=38; Aug. 25, 1997.*
Boulding, Aaron. "Xbox Live FAQ," Aug. 16, 2002; http://xbox.ign.com/articles/361/361526p1.html; Aug. 16, 2002.*
"Golden_Eye: 007," http://en.wikipedia.org/wiki/GoldenEye_007; Aug. 25, 1997.*

* cited by examiner

*Primary Examiner*—Doug Hutton
*Assistant Examiner*—Soumya Dasgupta
(74) *Attorney, Agent, or Firm*—Fitzpatrick, Cella, Harper & Scinto

(57) ABSTRACT

A remote control apparatus is disclosed, in which a first remote control device and a second remote control device can be separated or combined. A configuration is also disclosed in which a remote control apparatus including a first remote control device and a second remote control device controls a display apparatus. Also disclosed is a display apparatus controlled by a remote control apparatus including a first remote control device and a second remote control device that can be separated or coalesce.

8 Claims, 18 Drawing Sheets

FIG.6
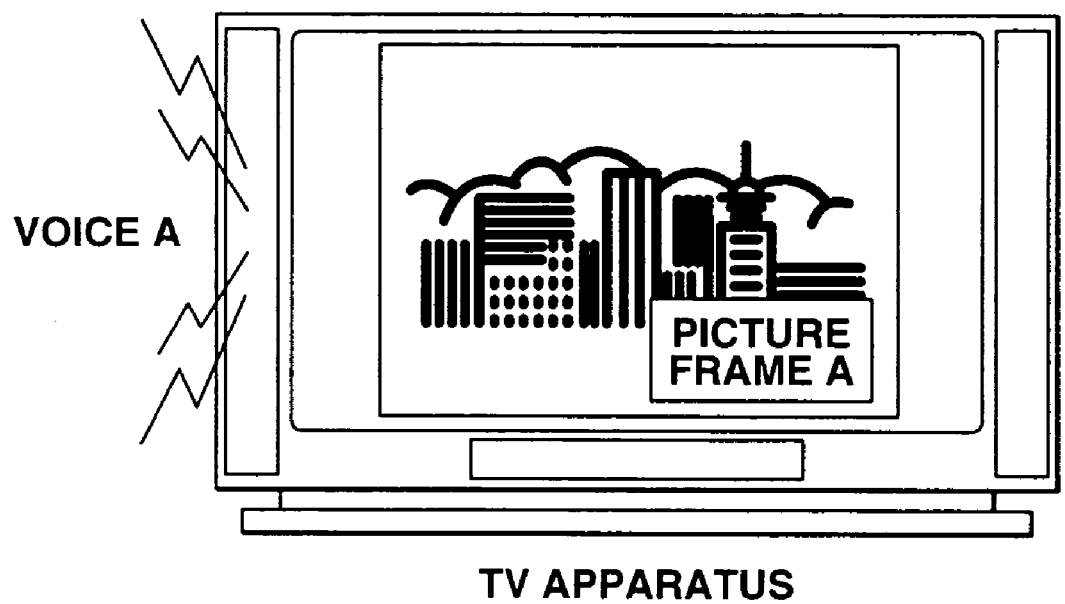
TV APPARATUS
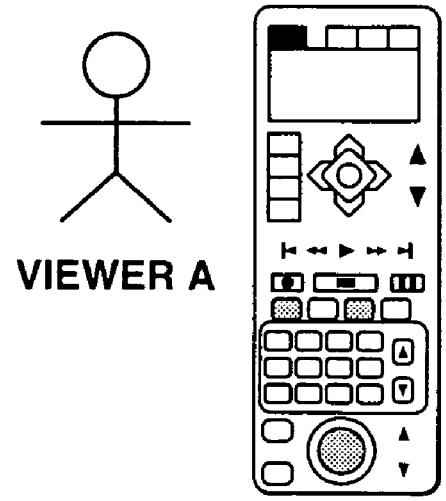
VIEWER A

FIG.8
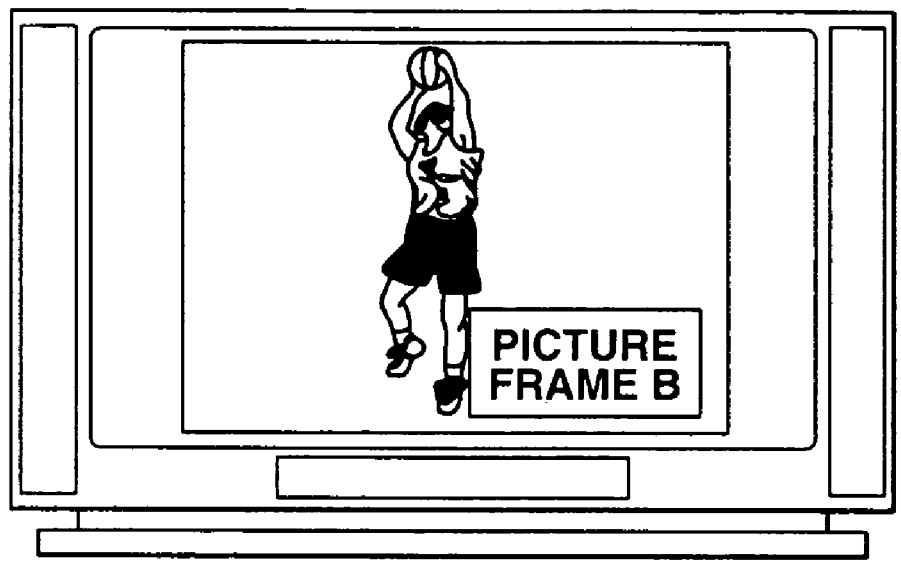
TV APPARATUS
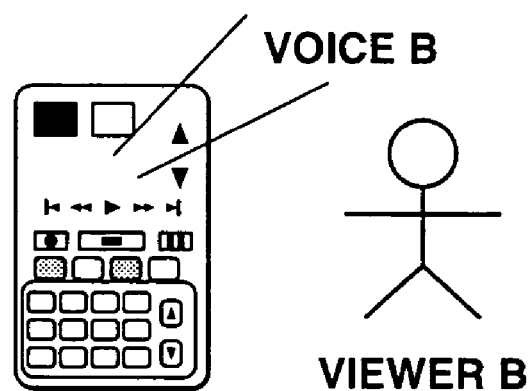
VIEWER B

FIG.9
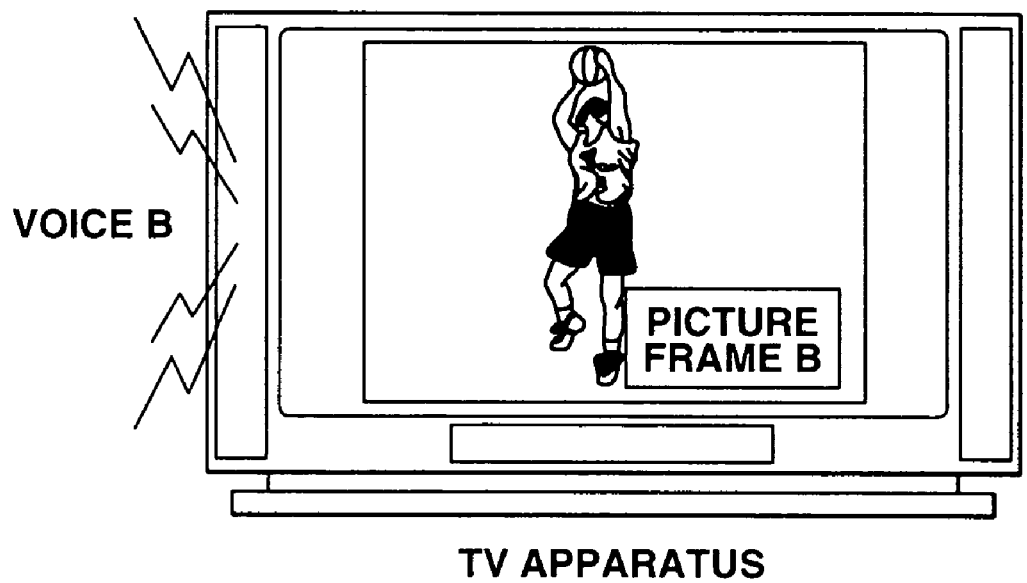
TV APPARATUS
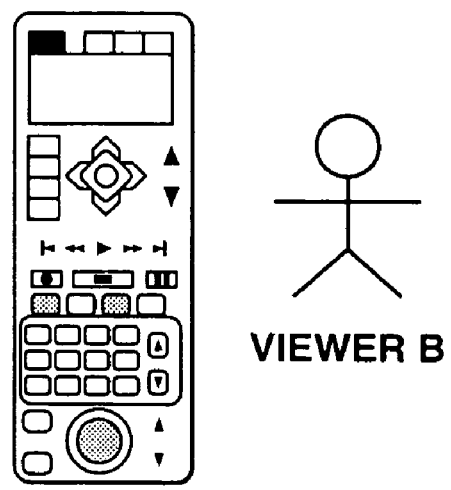

FIG.16
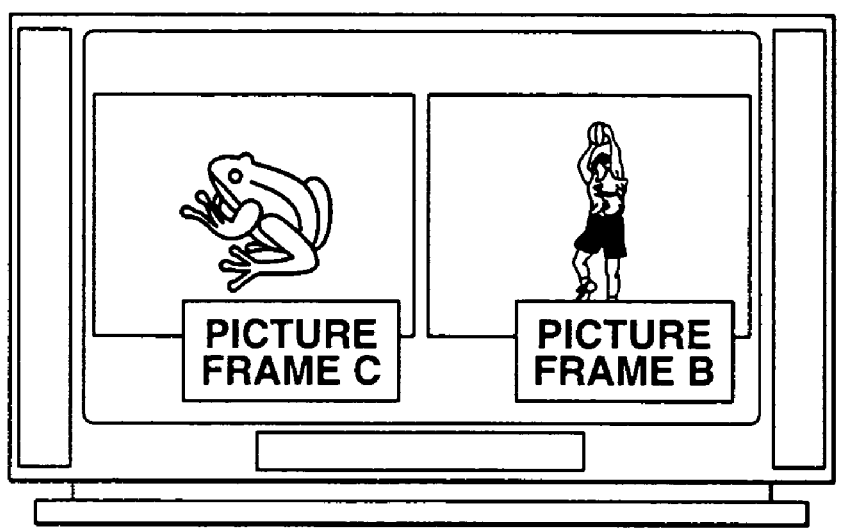
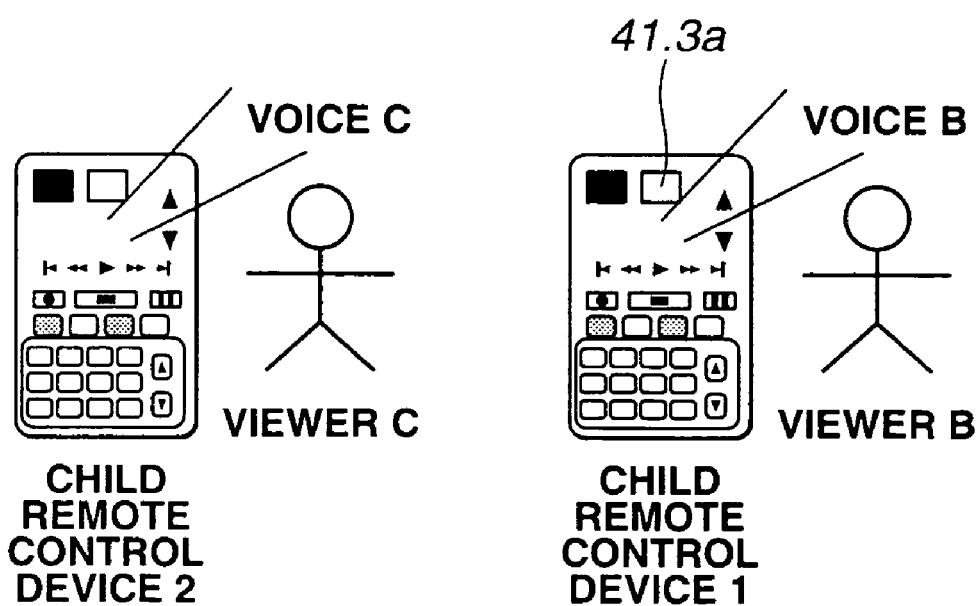

FIG.17
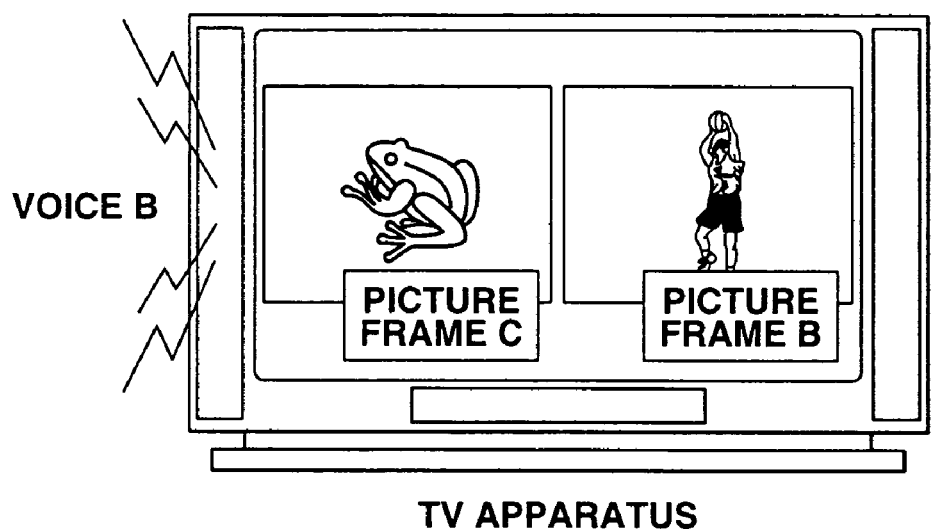
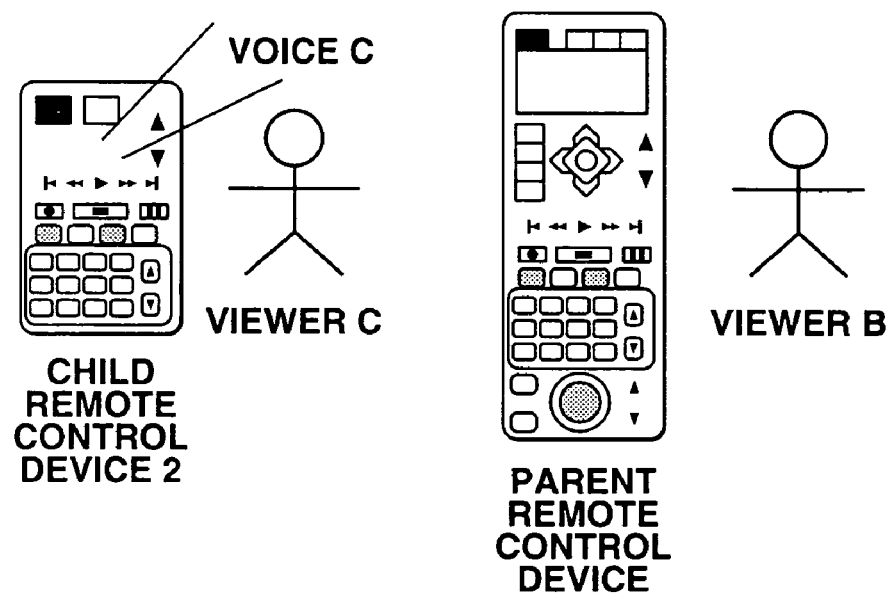

DISPLAY APPARATUS AND REMOTE CONTROL APPARATUS

BACKGROUND OF THE INVENTION

1. Field of the Invention

The present invention relates to a remote control apparatus for performing remote control, and to a display apparatus.

2. Description of the Related Art

Various apparatuses are objects of remote control. Display apparatuses are one example of such apparatuses.

Recently, contents that can be viewed are remarkably increasing as a result of appearance of multichannel media according to digital broadcast, satellite broadcast and the like, new contents media, such as DVDs (digital versatile discs), and the like. On the other hand, the sizes of television picture surfaces are increasing as a result of the appearance of plasma display apparatuses and the like, and there is demand for an arrangement that would allow a plurality of viewers to view separate programs or contents on one television apparatus (television broadcast receiver).

In addition, as television apparatuses have come to have more and more higher functions, a remote control apparatus, having a very large number of buttons for complicated operations in order to operate the entire television apparatus and perform various settings, is required, resulting in an increase in the production cost, and difficulty in operation.

U.S. Pat. No. 6,493,008, its counterpart Japanese Patent Application Laid-Open (Kokai) No. 2000-305543 (2000) disclose a configuration including a display apparatus for displaying multiple picture frames and a remote control device.

SUMMARY OF THE INVENTION

It is an object of the present invention to provide a remote control apparatus that can be easily managed and that can be flexibly used.

It is another object of the present invention to provide a remote control apparatus used for controlling a display apparatus in which each of a plurality of viewers can suitably perform operations for viewing a particular respective picture frame at the same time.

It is still another object of the present invention to provide a display apparatus for displaying a plurality of picture frames in which a suitable viewing environment can be realized.

According to one aspect of the present invention, a display apparatus operated by a remote control apparatus including a first remote control device and a second remote control device that can be switched between a combined state and a separated state includes a display unit, and a communication portion to communicate with the first and the second remote control devices. A number of display picture frames displayed on the display unit is changed in accordance as the first remote control device and the second remote control device are combined with, or are separated from, each other.

A configuration in which control for increasing the number of display picture frames is performed in respond to separation of the first remote control device and the second remote control device from each other, or a configuration in which the number of display picture frames is reduced in respond to combination of the first remote control device and the second remote control device with each other may be suitable adopted.

In this application, a "remote control device" indicates a device that performs operations for controlling an apparatus to be controlled, such as a display device or the like, at a position separated from the housing of the object to be controlled.

According to another aspect of the present invention, a display apparatus operated by a remote control apparatus including a first remote control device and a second remote control device that can be switched between a combined state and a separated state includes a display unit, and a communication portion, to communicate with the first and the second remote control devices. Each of different picture frames displayed on the display unit is controlled in accordance with operations of a corresponding one of the first remote control device and the second remote control device.

According to still another aspect of the present invention, a display apparatus controlled by operating a remote control device includes a display unit where a plurality of display picture frames are displayed, and a transmission circuit for transmitting to the remote control device a voice signal corresponding to a predetermined one of the picture frames controlled by operations of the remote control device from among the plurality of picture frames.

According to yet another aspect of the present invention, a display apparatus controlled by operation of a remote control device includes a display unit for forming one or more display picture frames, a control circuit for performing control so as to form the one or more display picture frames on the display unit, a circuit for receiving a signal for controlling a predetermined picture frame from among the plurality of display picture frames, from the remote control device, and a circuit for transmitting a voice signal corresponding to the predetermined picture frame to the remote control device.

According to yet a further aspect of the present invention, a remote control apparatus for controlling a display apparatus includes a first remote control device, and a second remote control device. The first remote control device and the second remote control device can be switched between a state in which these devices are combined and a state in which these devices are separated. A picture frame newly displayed on the display apparatus in response to the first remote control device and the second remote control device being switched from the combined state to the separated state is controlled by one of the first remote control device and the second remote control device.

According to still another aspect of the present invention, a remote control apparatus for controlling a display apparatus includes a first remote control device, and a second remote control device. The first remote control device and the second remote control device can be switched between a state in which these devices are combined and a state in which these devices are separated. When the first remote control device and the second remote control device are switched from the separated state to the combined state, one of the remote control devices generates a signal for stopping display of a picture frame display of which had been under control of one or the other of the first display device and the second display device.

According to still another aspect of the present invention, a remote control apparatus for controlling a display apparatus includes a first remote control device, and a second remote control device. The first remote control device and the second remote control device can be switched between a state in which these devices are combined and a state in which these devices are separated. The first remote control device controls a first picture frame from among a plurality of picture frames displayed on the display apparatus and the second remote control device controls another picture frame from among the plurality of picture frames.

In each of the above-described remote control apparatuses, a signal for discriminating between the state in which the first remote control device and the second remote control device are combined, and the state in which the first control device and the second remote control device are separated, may be output by one or the other of the remote control devices.

According to still another aspect of the present invention, a remote control apparatus for controlling a predetermined apparatus includes a first remote control device, and a second remote control device. The first remote control device and the second remote control device can be switched between a state in which these devices are combined and a state in which these devices are separated. The remote control apparatus further includes a transmission circuit for outputting a signal for discriminating between the state in which the first remote control device and the second remote control device are combined and the state in which the first remote control device and the second remote control device are separated.

In the above-described invention, the signal for discriminating between the state in which the first remote control device and the second remote control device are combined and the state in which the first remote control device and the second remote control device are separated, may have various forms. The signal may be output when switching the state or while maintaining a state. For example, the signal may be a signal indicating that the state has been switched from one state to the other state, a signal indicating that the combined state is maintained, or a signal indicating that the separated state is maintained. Various controls can be performed according to this signal. For example, in one aspect of the invention, the display apparatus recognizes that the remote control devices are separated based on the signal, and can perform control so as to display a new display picture frame. In another aspect of the invention, the display apparatus can stop display of a predetermined picture frame based on the signal.

The remote control apparatus may include a transmission circuit for outputting this signal. A circuit for transmitting a signal for causing the first remote control device or the second remote control device to perform an ordinary operation (channel switching, adjustment of volume, or the like) for the display apparatus may be used as the transmission circuit. Alternately, a circuit other than the above-described circuit may be separately provided. The transmission circuit may be provided at a position other than the first remote control device or the second remote control device. For example, a configuration may be adopted in which the remote control apparatus has a holder for holding the first remote control device and the second remote control device, and the holder has the transmission circuit.

In each of the above-described remote control apparatuses, a configuration in which at least one of the first remote control device and the second remote control device has a circuit for receiving a voice signal may be suitably adopted.

The received voice signal can be converted into a voice by a speaker provided in the remote control device. The received voice signal (or a signal obtained by processing the voice signal) may be output to an earphone, a headphone or a speaker connected to the remote control device via a terminal where the earphone, the headphone or the speaker can be connected.

BRIEF DESCRIPTION OF THE DRAWINGS

FIG. 6 is a diagram illustrating the states of a television apparatus and a remote control device when only a viewer A views a picture frame in the first embodiment;

FIGS. 8 and 9 are diagrams, each illustrating the states of a television apparatus and a remote control device when only a viewer B views a picture frame in the first embodiment;

FIGS. 16 and 17 are diagrams, each illustrating the states of a television apparatus and remote control devices when a viewer B and a viewer C individually view different picture frames in the second embodiment.

DETAILED DESCRIPTION OF THE PREFERRED EMBODIMENTS

Preferred embodiments of the present invention will now be described in detail with reference to the drawings. Particularly, in the following embodiments, specific configurations in which a display apparatus is controlled by operating a remote control apparatus will be illustrated. Particularly, cases in which a plurality of picture frames are displayed on a display unit of a display apparatus will be illustrated. In the embodiments, a plurality of picture frames can be easily controlled, and a voice output is individually obtained in accordance with a picture frame.

First Embodiment

Figure 1:
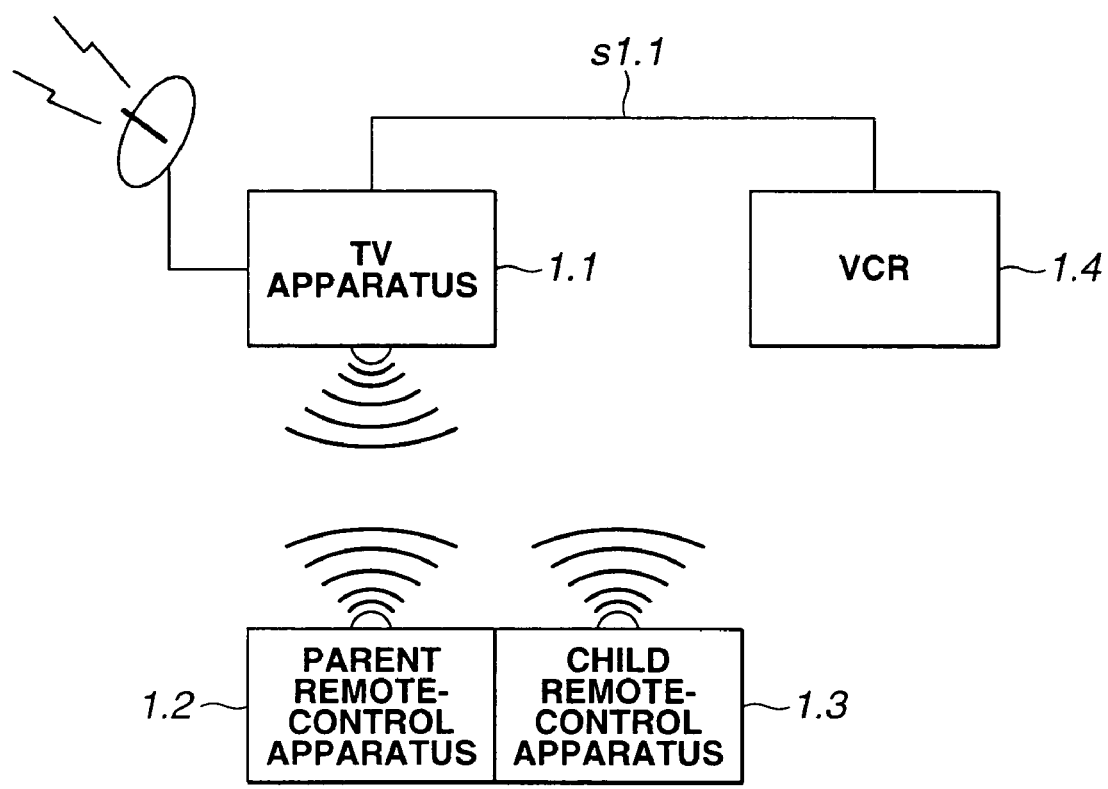
FIG. 1 is a block diagram illustrating the configuration of a television system according to a first embodiment of the present invention.

A first embodiment of the present invention will now be described. FIG. 1 is a block diagram illustrating the configuration of a television system including a television broadcast receiver according to the first embodiment.

In FIG. 1, a television apparatus 1.1 performs television reception, data transmission/reception with an apparatus connected to a network s1.1, and data transmission/reception with remote control devices 1.2 and 1.3, displays an image including voice, operation data and the like, and outputs voice. The remote control devices 1.2 and 1.3 can be separated or combined, and are used when a single television viewer or a plurality of television viewers control or operate the television apparatus 1.1, a VCR (video cassette recorder) 1.4, and the like. The VCR 1.4, which records and reproduces television or other images and voice data, is controlled via the network s1.1, and can output an image and voice to the television apparatus 1.1. The network s1.1 interconnects the television apparatus 1.1, the VCR 1.4 and the like, and performs data transmission/reception.

Figure 2:
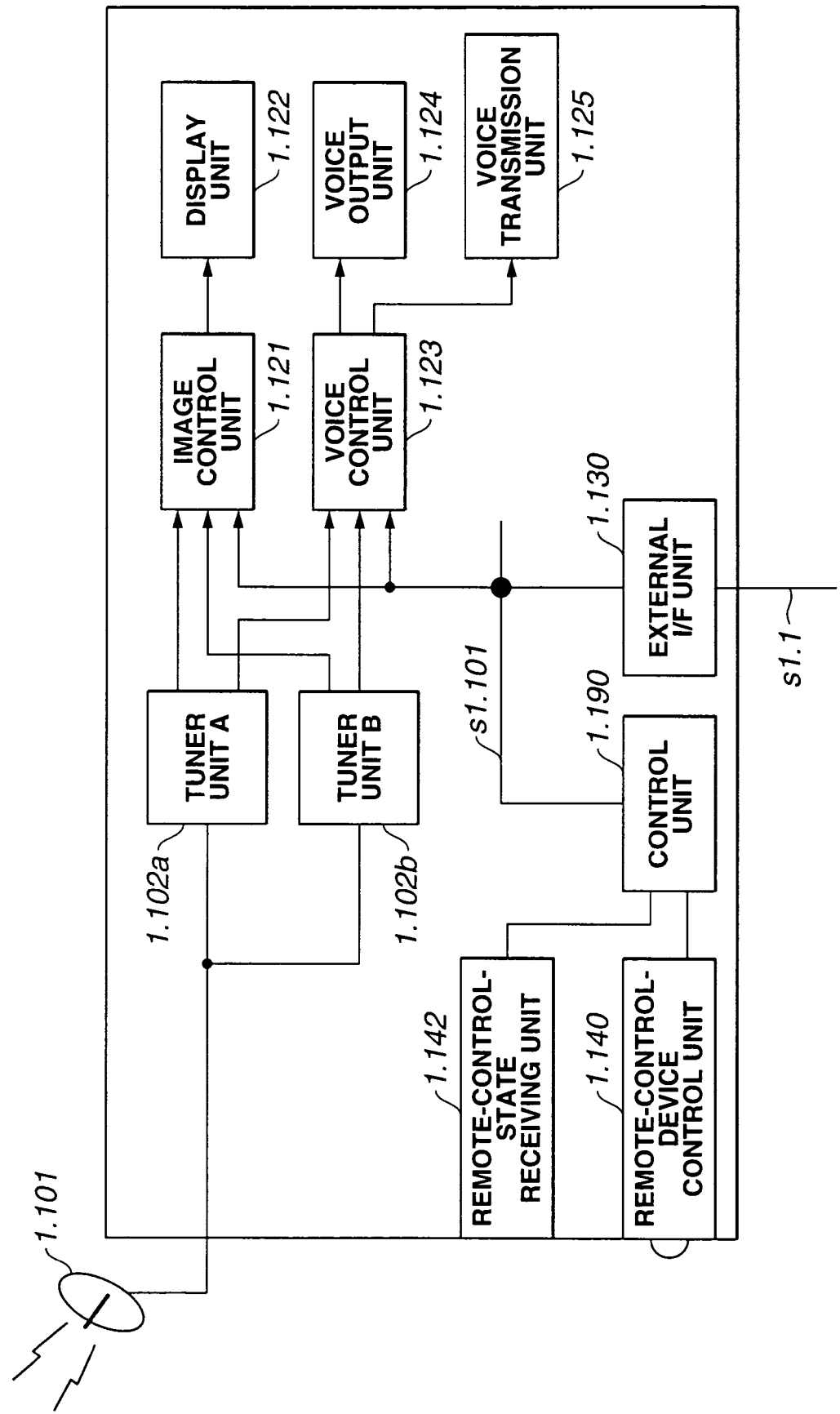
FIG. 2 is a block diagram illustrating the configuration of a television broadcast receiver 1.1 shown in FIG. 1.

FIG. 2 is a diagram illustrating the details of the television apparatus 1.1.

In FIG. 2, an antenna unit 1.101 receives a television signal from the outside of the apparatus, converts the received television signal into a high-frequency electric signal, and transmits the electric signal to a tuner unit 1.102.

Each of tuner units 1.102a and 1.102b amplifies a high-frequency television signal from the antenna unit 1.101, selects a desired station or channel, demodulates the amplified signal, separates the resultant signal into an image/voice signal and other data signal, decodes the image/voice signal, and outputs the resultant signal to an image control unit 1.121 and a voice control unit 1.123. The image/voice signal is output to an external I/F (interface) unit 1.130 whenever necessary. The other data signal is output to a bus s1.101 whenever necessary.

The image control unit 1.121 switches or synthesizes image data from the tuner units 1.102a and 1.102b and image data obtained via the bus s1.101 according to control from a control unit 1.190 (to be described below), and outputs resultant data to a display unit 1.122.

The display unit 1.122 displays image data from the image control unit 1.121. The display unit 1.122 in the first embodiment can perform display at least with a vertical resolution of at least 1,080 lines and a horizontal resolution of at least 1,920 lines, and is a high-resolution dot-matrix display. The display unit 1.122 may have various configurations. For example, a flat display panel using liquid-crystal elements, plasma elements, electroluminescent elements, or cold-cathode electron emission elements as display elements, or a CRT (cathode-ray tube) may be used.

The voice control unit 1.123 switches or synthesizes voice data from the tuner units 1.102a and 1.102b, and the internal bus s1.101, controls volume, voice quality, the feeling of being at a live spot, and the like, and outputs the resultant data to a voice output unit 1.124 and a voice transmission unit 1.125.

The voice output unit 1.124 amplifies the voice signal input from the voice control unit 1.123, and outputs a voice from a speaker.

The voice transmission unit 1.125 retransmits the voice data from the voice control unit 1.123 to the remote control device 1.3 by performing FM (frequency modulation).

The external I/F unit 1.130 operates as an interface for data transmission/reception between the television apparatus 1.1 and the VCR 1.4 via the bus s1.1.

A remote-control control unit 1.140 is a remote-control transmission/reception control unit utilizing infrared rays, that performs data transmission/reception with the remote control devices 1.2 and 1.3 operated by television viewers (to be described below), and transfers the data to a system control unit 1.150.

A remote-control-state receiving unit 1.142 receives separation/combination information of the remote control devices from the parent remote control device 1.2. When the remote control devices 1.2 and 1.3 are separated or combined, the remote-control-state receiving unit 1.142 receives a radio signal transmitted from a remote control apparatus and indicating the change, and transfers the received signal to the system control unit 1.150.

In the first embodiment, in order to allow reception of separation/combination information of a remote control device irrespective of the direction of the remote control device, an FM wave is used.

A control unit 1.190 integrally controls the inside of the television apparatus 1.1 connected to the bus s1.101 (to be described below).

In television reception, the control unit 1.190 controls the antenna unit 1.101 and the tuner unit 1.102 that have been described above, to perform channel switching, accounting control, control of EPG (electronic programming guide) data, and the like. The control unit 1.190 also controls the image control unit 1.121, to perform control of synthesis and display of image/voice signals from the two tuner units 1.102a and 1.102b, and the VCR 1.4, icons, various sets of information, and the like.

The control unit 1.190 also controls the voice control unit 1.123, to perform control of synthesis and output of voices, and control of output to the voice output unit 1.124 and the voice transmission unit 1.125. The control unit 1.190 also controls the external I/F unit 1.130, to perform data transmission/reception by controlling the VCR 1.4 connected to the network s1.1, via the network s1.1. Each of the above-described controls by the control unit 1.190 is appropriately performed by recognition of a proper signal from the remote-control control unit 1.140 or from the remote-control-state receiving unit 1.142, or based on the state of the inside of the television apparatus 1.1 or information from the external I/F unit 1.130.

The internal bus s1.101 is a data and control bus provided within the television apparatus 1.1, and is used for transfer of image and voice data and transfer of respective sets of information, as described above.

Figure 3:
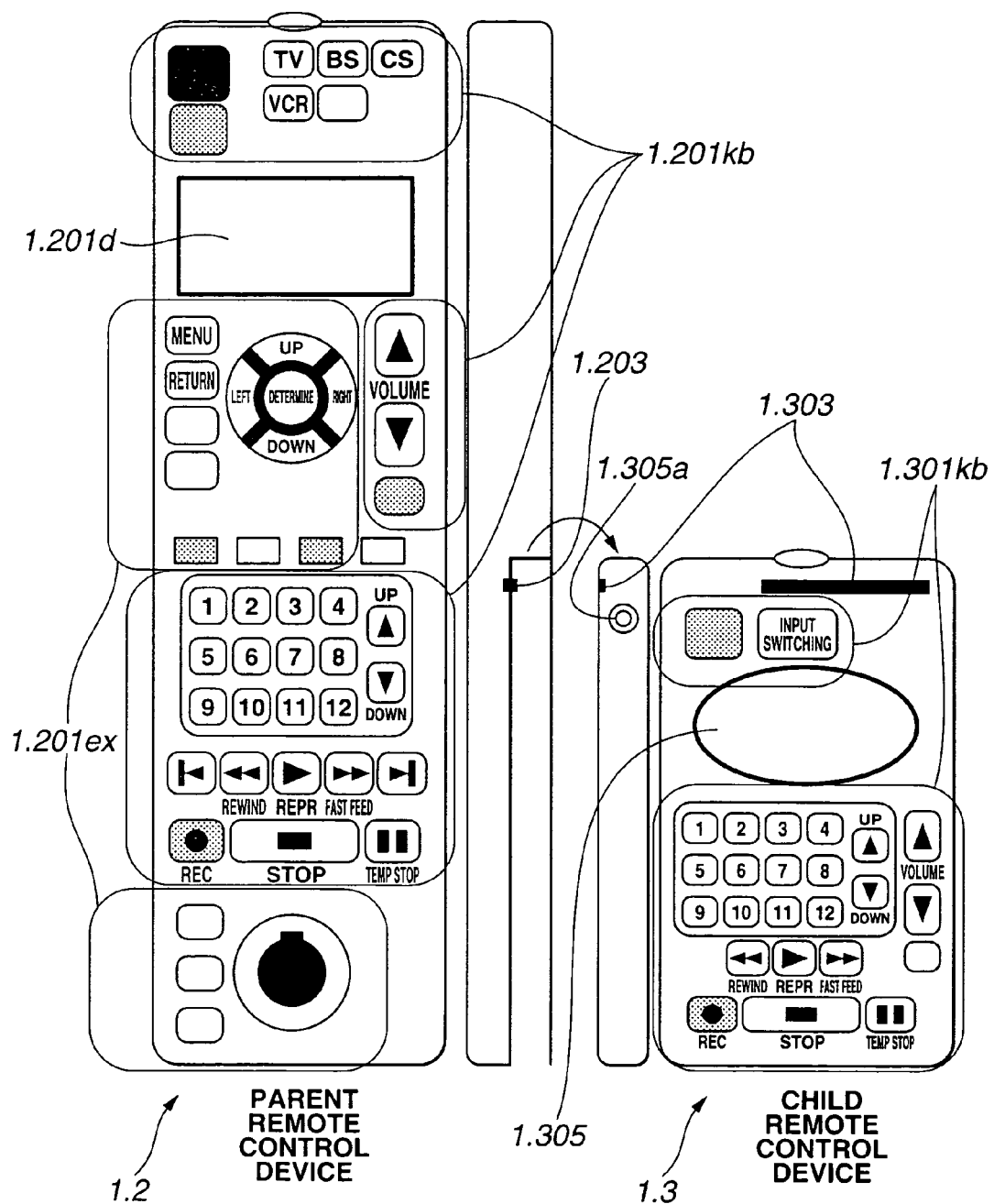
FIG. 3 is a diagram illustrating remote control devices according to the first embodiment.

FIG. 3 is a diagram illustrating the external appearances of the parent remote control device (first remote control device) 1.2 and the child remote control device (second remote control device) 1.3 that can be combined/separated, and that are used in the first embodiment.

As shown in FIG. 3, the parent remote control device 1.2 includes television viewing basic buttons 1.201kb, television expansion operation buttons 1.201ex and a display device 1.201d, and can operate the entire television apparatus 1.1. The child remote control device 1.3 includes television viewing basic buttons 1.301kb and a voice output speaker 1.305, in order to allow operations relating to viewing of the television apparatus 1.1.

Each of the remote control devices 1.2 and 1.3 has a picture-frame on/off button, in order to allow addition/deletion of a picture frame.

The child remote control device 1.3 can be combined with/be separated from the back of the parent remote control device 1.2. During connection or combination of the two remote control devices, a separation/combination detection/ communication unit 1.203 of the parent remote control device 1.2 is connected to a separation/combination detection/communication unit 1.303 of the child remote control device 1.3, so that the two remote control devices can exchange data via these communication units.

Figure 5:
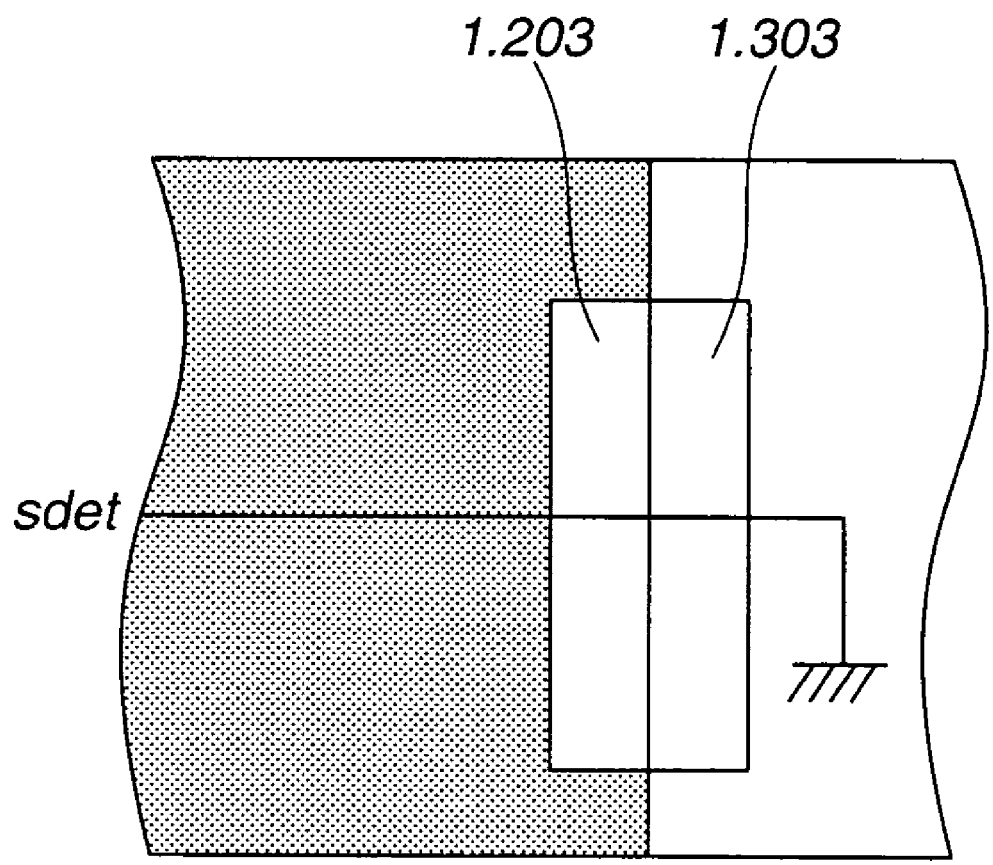
FIG. 5 is a diagram illustrating connection portions of the parent remote control device and the child remote control device according to the first embodiment.

As shown in FIG. 5, one signal line sdet in the communication units is pulled up (by a voltage source, for example) via a resistance at the parent remote control device 1.2, and is grounded at the child remote control device 1.3. When the two remote control devices are separated, an electric level changes to permit detection of the change in separation/combination status of the remote control devices. Herein, the terms "combined" state and "separated" state are used generically to encompass a large number of ways in which the two or more remote control devices may be, in some sense, coupled together. For example, the manner of attachment may be mechanical, such as a snap-together arrangement, sliding engagement, hooks-and-loops, or the like, with provision being made in each case for communication of information between the remote control devices as needed. Alternative arrangements are also within the broad scope of the invention, for example, even if not at present preferred, such as connection by means of a detachable electrical or optical connector.

Figure 4:
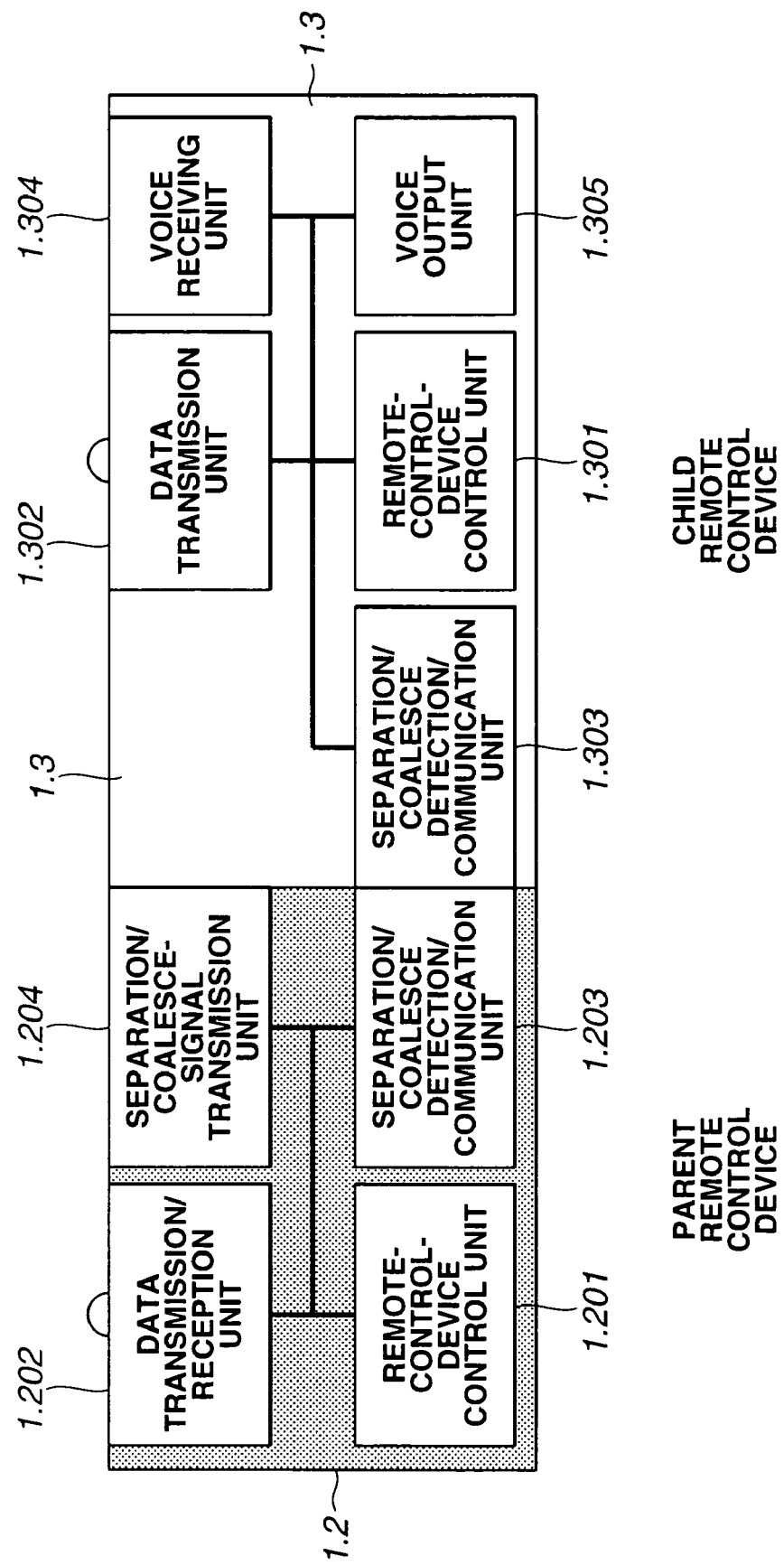
FIG. 4 is a block diagram illustrating the configurations of a parent remote control device and a child remote control device according to the first embodiment.

FIG. 4 is a block diagram illustrating the details of the parent remote control device 1.2 and the child remote control device 1.3. As described above, the parent remote control device 1.2 can be separated from/combined with the child remote control device 1.3.

In FIG. 5, a remote-control-device control unit 1.201 controls the buttons 1.201*kb* and 1.201*ex* and the display device 1.201*d* that have been described above.

A data transmission/reception unit 1.202 transmits remote control data generated in the remote-control-device control unit 1.201 to the remote-control control unit 1.140 within the television apparatus 1.1, or receives and displays data from the inside of the television apparatus 1.1.

A separation/coalesce detection/communication unit 1.203 detects separation/combination of the child remote control device 1.3, and exchanges data with the child remote control device 1.3 during coalesce of the child remote control device 1.3.

When the remote-control-device control unit 1.201 has detected a change in separation/combination status based on information from the separation/combination detection/communication unit 1.203, a separation/combination-signal transmission unit 1.204 transmits information relating to the change of state to the television apparatus 1.1 using an FM signal.

A remote-control-device control unit 1.301 controls the above-described buttons 1.301*kb*.

A data transmission unit 1.302 transmits remote control data generated in the remote-control-device control unit 1.301 to the remote-control control unit 1.140 within the television apparatus 1.1.

A separation/combination detection/communication unit 1.303 detects separation/combination status of the parent remote control device 1.2, and exchanges data with the parent remote control device 1.2 during combination with the parent remote control device 1.2.

A voice receiving unit 1.304 receives and reproduces FM voice data from the voice transmission unit 1.125, and outputs the reproduced data to a voice output unit 1.305.

The voice output unit 1.305 amplifies the voice signal from the voice receiving unit 1.304, and outputs a voice represented by the signal from a speaker. In order for a user to be able to hear the voice also by means of an earphone, as shown in FIG. 3, an earphone jack 1.305*a* is provided in the child remote control device 1.3.

Next, a description will be provided of operations involved in viewing television by two viewers using the remote control devices of the first embodiment, with reference to FIGS. 6-9, 11 and 18.

First, as shown in FIG. 6, a viewer A views the television apparatus 1.1 by operating a combined remote control device in which the parent remote control device 1.2 and the child remote control device 1.3 are combined. In this case, only a picture frame A is displayed.

When a viewer B intends to view television on a different picture frame, the viewer B separates the child remote control device 1.3 from the combined remote control device. The parent remote control device 1.2 detects this change in state, and transmits a remote-control separation signal.

Figure 18:
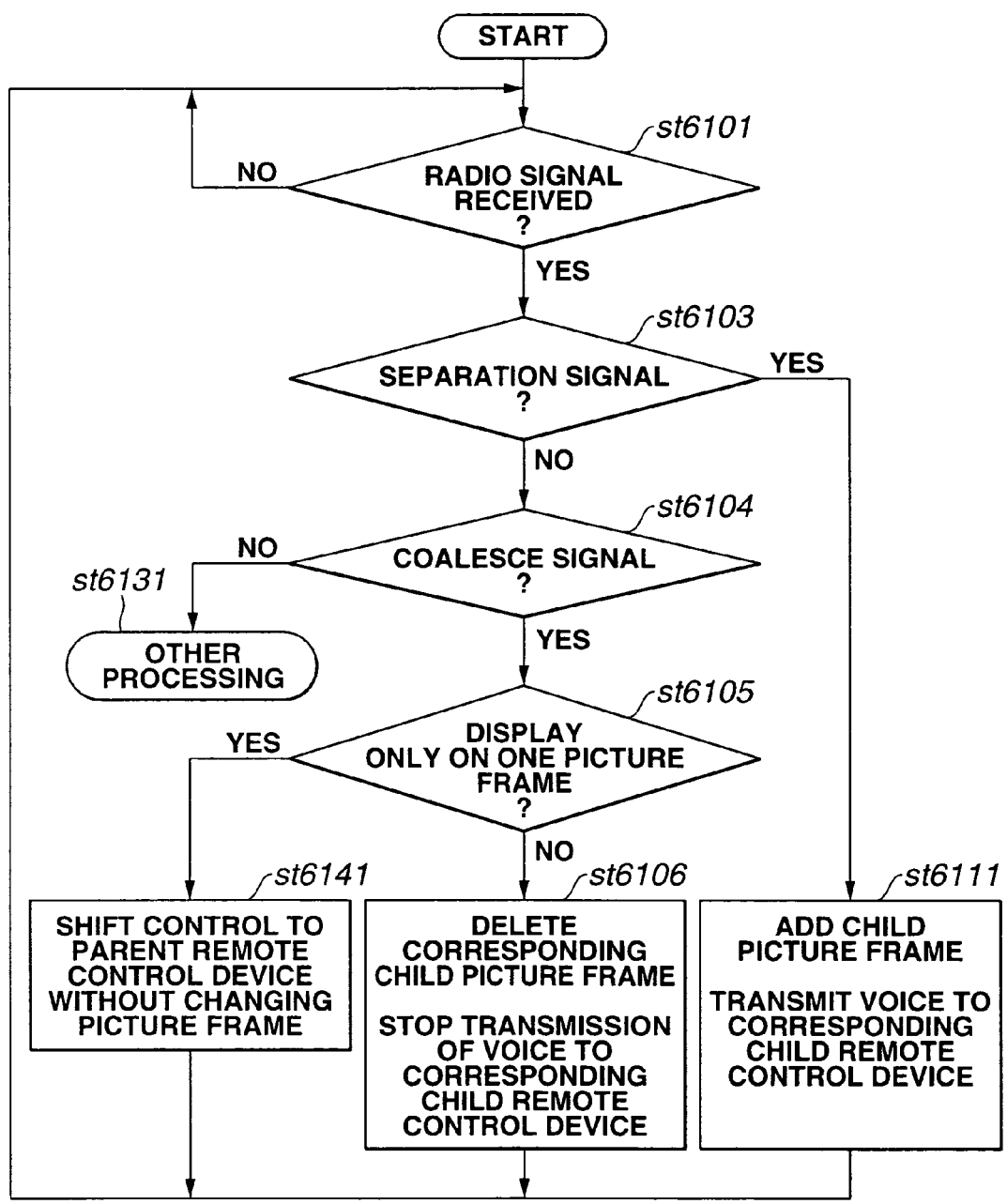
FIG. 18 is a flowchart illustrating the flow of operations in the second embodiment.

On the other hand, the system control unit 1.190 of the television apparatus 1.1 monitors presence/absence of a signal using the remote-control-state receiving unit 1.142 (step 6101 in FIG. 18).

Figure 7:
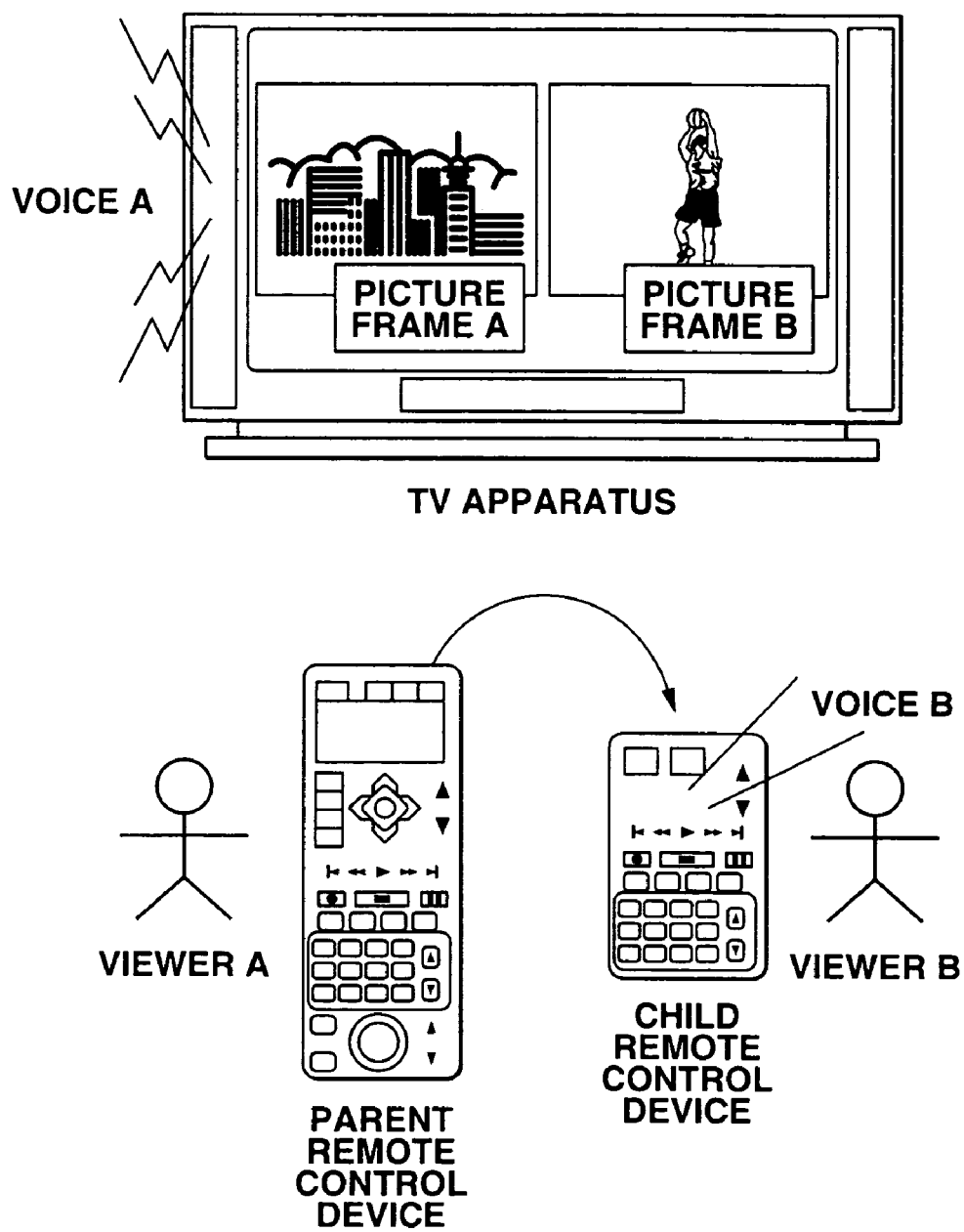
FIG. 7 is a diagram illustrating the states of a television apparatus and remote control devices when a viewer A and a viewer B individually view different picture frames in the first embodiment.

When a signal has been received, if the received signal is a signal indicating separation of the remote control devices (step 6103 in FIG. 18), then, as shown in FIG. 7, a new picture frame B is added to the picture surface of the television apparatus 1.1. At the same time, child-picture-frame adding processing is performed in which, by controlling the voice control unit 1.123 and the voice transmission unit 1.125, transmission of the voice of the added picture frame from the voice transmission unit 1.125 to the child remote control device 1.3 is started (step 6111 in FIG. 18).

The viewer B can hear the voice of the added picture frame B from the speaker of the child remote control device 1.3. By operating the child remote control device 1.3, the viewer B inputs or switches a channel, and views contents different from the contents viewed by the viewer A.

When the viewer A and the viewer B individually view television on the picture frame A and the picture frame B, respectively, and when the viewer B intends to stop viewing, the child remote control device 1.3 is combined with the parent remote control device 1.2. The parent remote control device 1.2 detects this state, and transmits a "combined" signal from the transmission unit 1.204. The system control unit 1.190 of the television apparatus 1.1 that has received the "combined" signal by the remote-control-state receiving unit 1.142 determines that there is a change in the combination state (step 6104 in FIG. 18), and then determines whether or not only one picture frame is displayed (step 6105 in FIG. 18). Since currently the viewer A and the viewer B are individually viewing the screen and two picture frames are displayed, picture-frame deleting processing, in which the picture frame B operated by the child remote control device 1.3 is deleted, and the picture frame A viewed by the viewer A is again displayed on the entire picture surface of the television apparatus 1.1, and voice stopping processing, in which by controlling the voice control unit 1.123 and the voice output unit 1.125, transmission of voice is stopped, are performed (step 6106).

Figure 11:
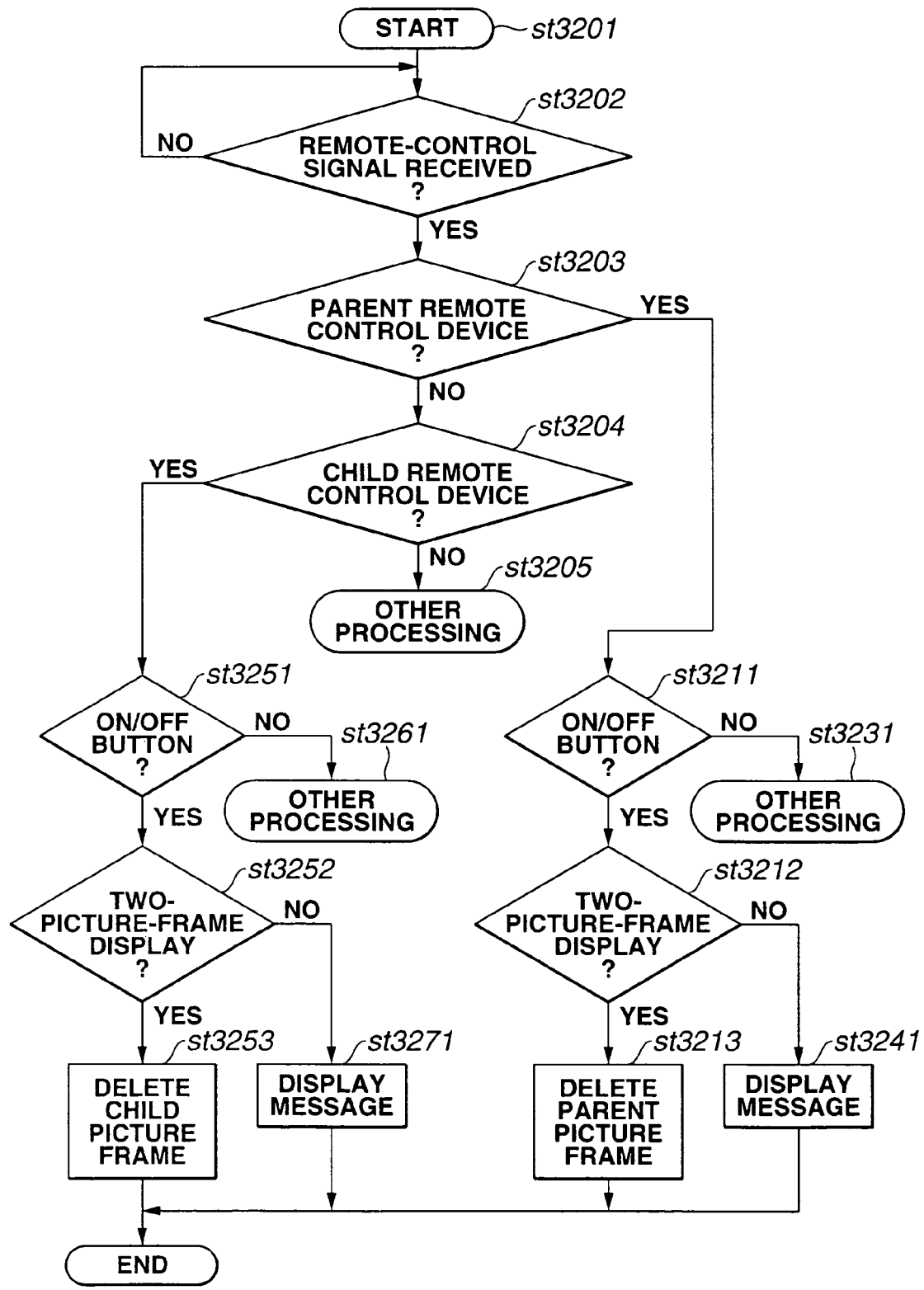
FIG. 11 is a flowchart illustrating the flow of operations in the first embodiment.

When the viewer B intends to stop viewing and depresses the picture-frame on/off button of the child remote control device 1.3, a processing similar to the above-described processing is performed according to the procedure shown in FIG. 11. When a picture-frame-on/off signal is transmitted from the remote control device 1.3, the remote control unit 1.140 receives this signal (step 3202 in FIG. 11).

Then, it is determined whether the received signal is from the parent remote control device 1.2 (step 3203) or from the child remote control device 1.3 (step 3204). If the received signal is from the child remote control device, then, it is determined whether or not the picture-frame-on/off button of the child remote control device 1.3 has been depressed (step 3251). If the result of the determination in step 3251 is affirmative, then, it is determined whether or not two picture frames are currently displayed (step 3252). Since two picture frames are currently displayed, picture-frame deleting processing and voice stopping processing are performed (step 3253), in the same manner as described above.

When the viewer B stops viewing, the picture frame returns to the picture frame shown in FIG. 6.

When the viewer A and the viewer B view television on two different picture frames, and when the viewer A intends to stop viewing, the viewer A depresses the picture-frame on/off button of the parent remote control device 1.2. When the picture-frame on/off button of the parent remote control device 1.2 has been depressed and a picture-frame on/off signal has been transmitted, the remote-control-device control unit 1.140 receives the signal (step 3202).

Then, it is determined whether the received signal is from the parent remote control device 1.2 (step 3203) or from the child remote control device 1.3 (step 3204). If the received signal is from the parent remote control device, then, it is determined whether or not the picture-frame-on/off button of the parent remote control device 1.2 has been depressed (step 3211). If the result of the determination in step 3211 is affirmative, then, it is determined two picture frames are currently displayed (step 3212). Since two picture frames are currently displayed, picture-frame deleting processing of deleting the picture frame A viewed by the viewer A and displaying the picture frame B viewed by the viewer B on the entire picture surface of the television apparatus 1.1, and processing of stopping voice on the picture frame A are performed (step 3213).

At the same time, the picture frame shown in FIG. 8 is displayed.

When after individual viewing by the viewer A and the viewer B, the viewer A stops viewing and only the viewer B views television on the one picture frame B, and the parent remote control device 1.2 and the child remote control device 1.3 coalesce, then, in step 6105 shown in FIG. 18, it is determined whether or not two picture frames are displayed. Since only one picture frame is displayed, it is determined that the viewer A has stopped viewing. Hence, the picture frame is not deleted, and operations for the picture frame are shifted to the parent remote control device 1.2. At the same time, by controlling the voice control unit 1.123, the voice output unit 1.125 and the voice output unit 1.124, voice transmission from the voice transmission unit 1.125 is stopped, and voice is output from the voice output unit 1.124 (step 6141).

When, after individual viewing by the viewer A and the viewer B, the viewer A stops viewing and only the viewer B views television on the one picture frame B, and the picture-frame on/off button of the child remote control device 1.3 is depressed (steps 3202, 3203, 3204 and 3251 in FIG. 11), then, in step 3252, it is determined that only one picture frame is displayed, and deletion of the picture frame is not performed by displaying a message indicating incapability of deletion of a picture frame (step 3271).

At that time, the picture frame shown in FIG. 9 is displayed.

Second Embodiment

In a second embodiment of the present invention, single radio transmission/reception means (for example, Bluetooth or the like) operates as remote-control-device-separation/combination-information transmission means and means for transmitting/receiving a remote-control signal for a normal operation. In a child remote control device, the radio transmission/reception means also performs transmission/reception of voice between the child remote control device and a television apparatus. In the second embodiment, an example of operating three picture frames by means of a parent remote control device and two child remote control devices will be described.

Figure 12:
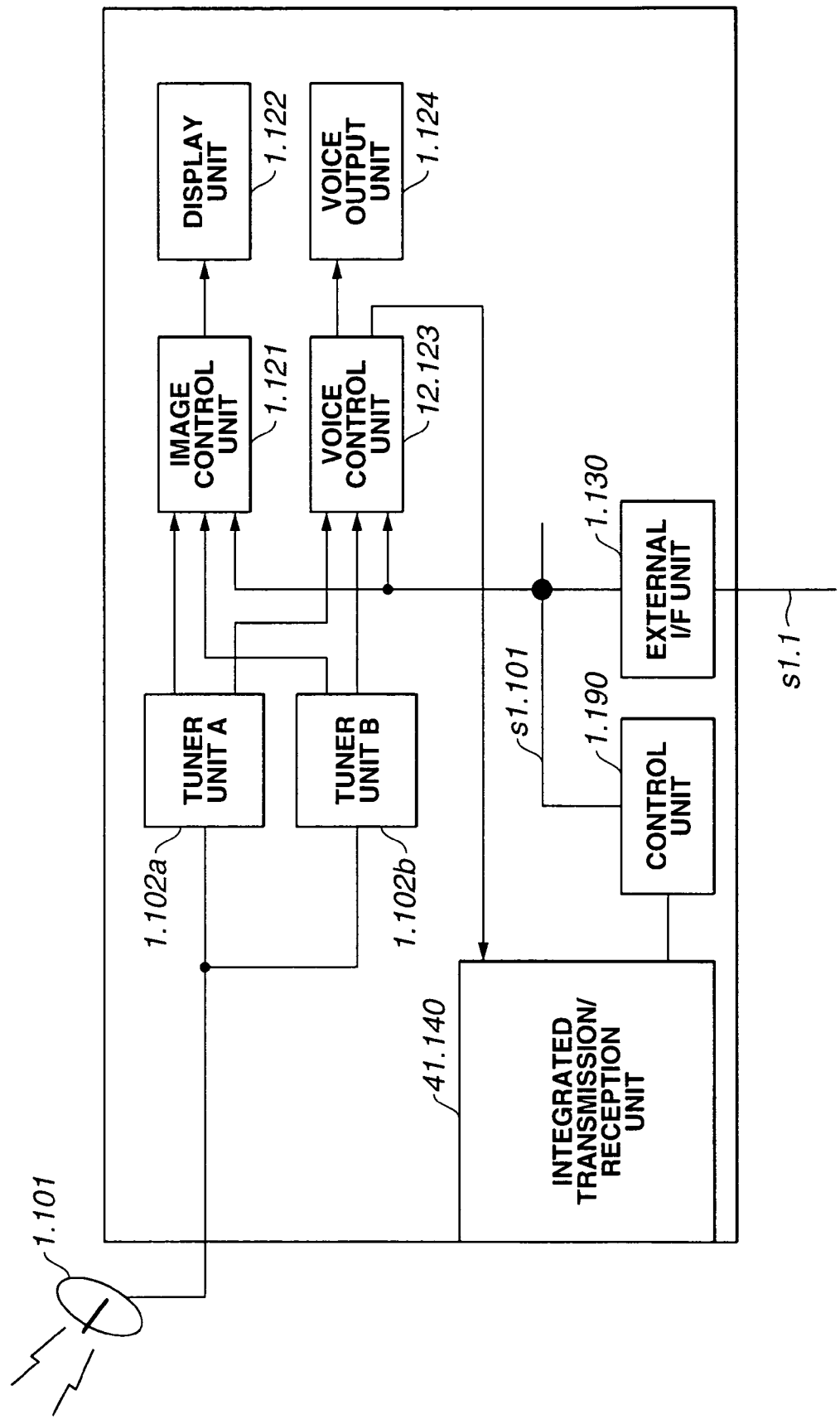
FIG. 12 is a block diagram illustrating the configuration of a television apparatus according to a second embodiment of the present invention.

FIG. 12 is a block diagram illustrating a television apparatus according to the second embodiment.

In FIG. 12, a voice control unit 12.123 has a voice compression encoding function in addition to the function of the voice control unit 1.123 of the first embodiment shown in FIG. 2. The voice control unit 12.123 performs compression encoding of voice corresponding to the picture frames of the television apparatus for child remote control devices 41.3*a* and 41.3*b* (to be described below).

An integrated transmission/reception unit 41.140 receives a remote-control-device separation/combination signal and a remote-control-device operation signal from a parent remote control device 41.2, and the child remote control devices 41.3*a* and 41.3*b*, and transmits a television-voice encoding signal input from the voice control unit 12123 to the child remote control devices 41.3*a* and 41.3*b*.

Other components are the same as those shown in FIG. 2.

Figure 13:
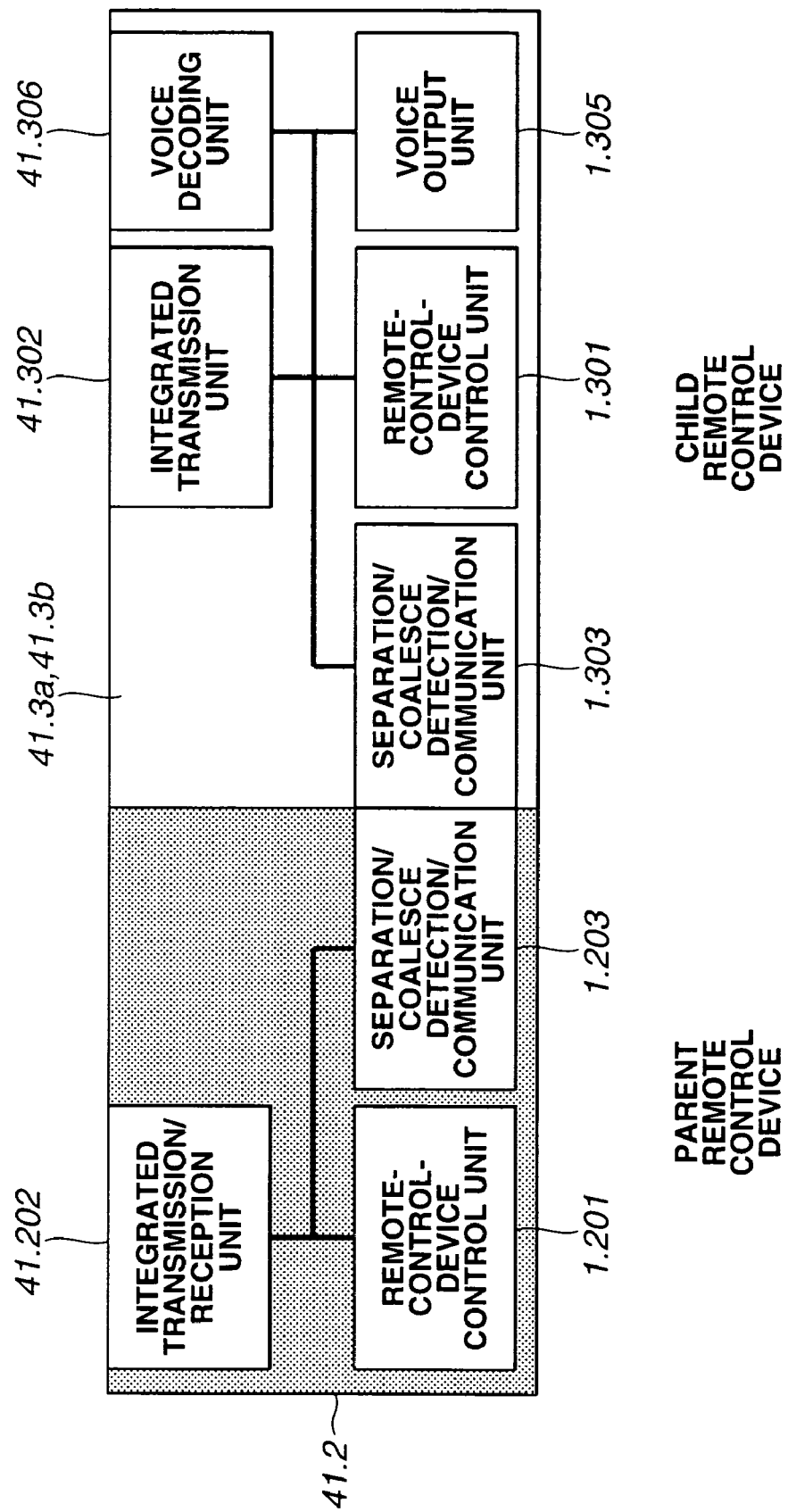
FIG. 13 is a block diagram illustrating the configuration of a remote control apparatus according to the second embodiment.
Figure 14:
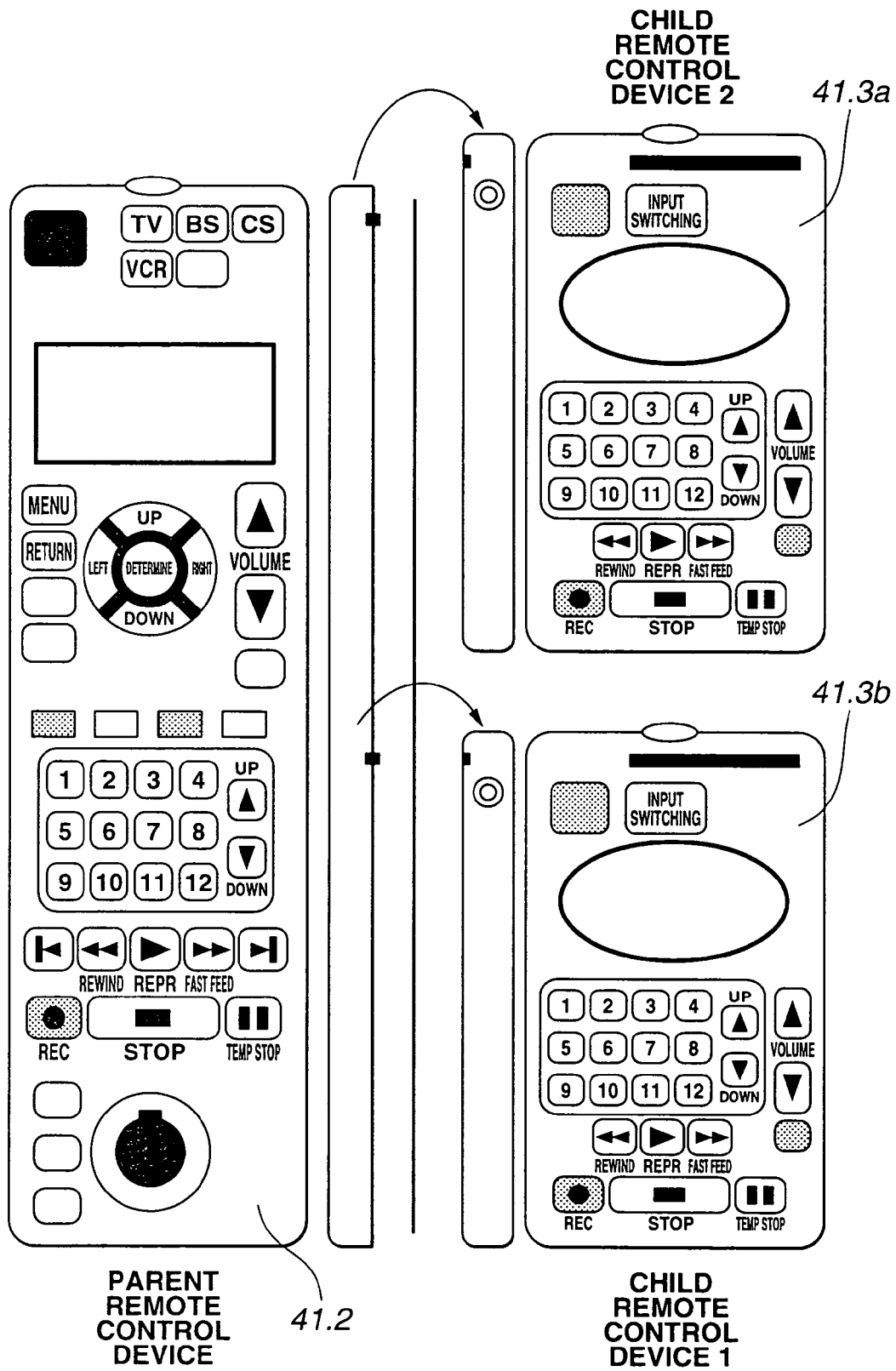
FIG. 14 is a diagram illustrating a parent remote control device and a plurality of child remote control devices according to the second embodiment.

FIG. 13 is a block diagram of the parent remote control device 41.2 and the child remote control devices 41.3*a* and 41.3*b* used in the second embodiment. Since the child remote control devices 41.3*a* and 41.3*b* have the same configuration in this embodiment, only one of the child remote control devices is illustrated.

An integrated transmission/reception unit 41.202 is identical to the above-described one 41.140, and transmits a remote-control-device separation/combination signal and a remote-control-device operation signal to the integrated transmission/reception unit 41.140 of the television apparatus.

An integrated transmission/reception unit 41.302 is identical to the above-described one 41.140, and transmits a remote-control-device operation signal and receives a voice signal from the integrated transmission/reception unit 41.140 of the television apparatus. Other components are the same as those of the child remote control device 1.3 shown in FIG. 4.

FIG. 13 illustrates a combined remote control device in which the two remote control devices 41.3*a* and 41.3*b* are combined with the parent remote control device 41.2.

Next, operations in the second embodiment will be described.

In the second embodiment, first, as in the case shown in FIG. 6, a viewer A views television by operating the combined remote control device. In this case, the parent remote control devices 41.2 and the two remote control devices 41.3*a* and 41.3*b* are combined, and only one picture frame A is displayed.

When a viewer B intends to view television on a different picture frame, the viewer B separates the child remote control device 41.3*a* from the combined remote control device. The parent remote control device 41.2 detects this change in state (or may simply detect the new state per se; this may be done in the first embodiment, as well), and transmits a remote-control-device separation signal.

On the other hand, the system control unit 1.190 of the television apparatus monitors presence/absence of a signal, using the integrated transmission/reception unit 41.140 (step 6101 in FIG. 18). When a signal has been received, if the received signal is a signal indicating separation of the remote control device (step 6103 in FIG. 18), then, as shown in FIG. 7, a new picture frame B is added to the picture surface of the television apparatus. At the same time, child-picture-frame adding processing is performed in which by controlling a voice encoding unit of the voice control unit 12123, transmission of the voice of the added picture frame from the integrated transmission/reception unit 41.140 to the child remote control device 41.3a is started (step 6111 in FIG. 18).

The viewer B can hear the voice of the added picture frame B from the speaker of the child remote control device 41.3a. By operating the child remote control device 41.3a, the viewer B inputs or switches a channel, and views contents different from the contents of the viewer A.

Figure 15:
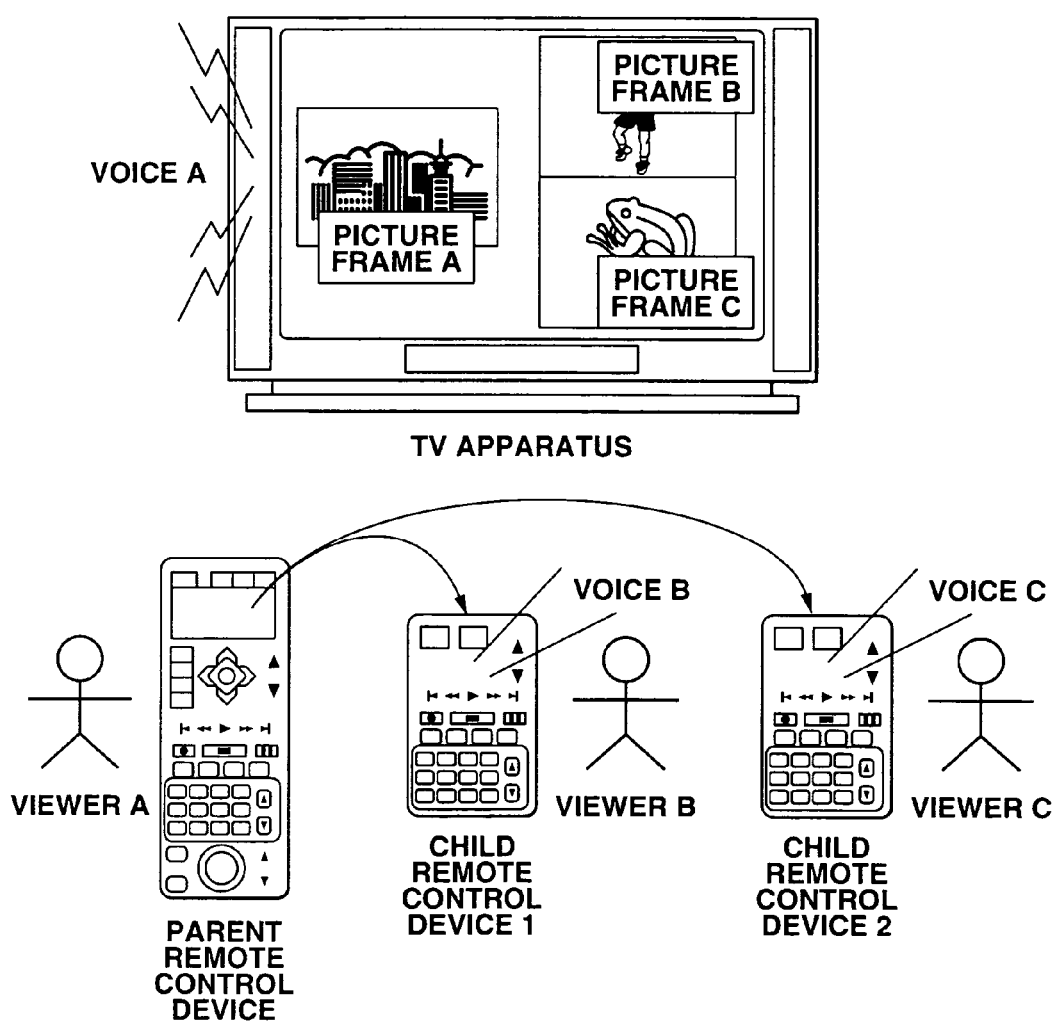
FIG. 15 is a diagram illustrating the states of a television apparatus and remote control devices when a plurality of viewers individually view different picture frames in the second embodiment.

When a viewer C intends to view television on a still different picture frame, the viewer C separates the child remote control device 41.3a from the combined remote control device. Then, according to the above-described operations shown in FIG. 18, a new picture frame C is further added, and voice is output from the child remote control device 41.3a, as shown in FIG. 15.

At that time, the viewers A, B and C individually view the picture frames A, B and C, respectively, using the parent remote control device 41.2 and the two child remote control device 41.3a and 41.3b. When the viewer B or C stops viewing from this state using a picture-frame on/off button, the state shown in FIG. 7 is provided.

When the viewer A stops viewing using a picture-frame on/off button, a state shown in FIG. 16 is provided. When the viewer B further combines the parent remote control device 41.2 with viewer B's child remote control device 41.3a, a state shown in FIG. 17 is provided, in which voice B is output from the television apparatus.

Although in the above-described embodiments, separation/combination of the parent remote control device and the child remote control device(s) is detected by a change in the level of an electric signal, any other means, such as detection of capability/incapability of the parent remote control device and the child control device to communicate with each other, via the communication units 1.203 and 1.303, may also be used.

As described above, a remote control device capable of operating the entire television apparatus, and a simple remote control device capable of performing only certain operations (for example, operations relating to one picture frame) are prepared, so as to be separated and to be combined. When a second or another viewer intends to view a different program, upon separation of a child remote control device for picture-frame operation from a combined remote control device, another picture frame appears on the picture surface of the television, and by selecting a station, television can be viewed. Accordingly, an operation for viewing an independent picture frame becomes very convenient.

There is also the effect that, by usually combined remote control devices, management of the remote control devices becomes easy.

In addition, there is also the effect that an inexpensive environment can be provided compared with a case of preparing a plurality of high-function remote control devices capable of operating the entire television apparatus.

Although in the foregoing description, a display apparatus has been illustrated as an object to be subjected to remote control, a remote control apparatus of the invention in which a first remote control device and a second remote control device can be separated or combined may also be suitably used as a remote control apparatus for remote control operation of a radio receiver, an audio reproducing apparatus or the like. In such a case, it is only necessary that different controls are performed by operating respective remote control devices when a plurality of remote control devices are separated. For that purpose, the remote control apparatus may be able to output a signal for allowing an apparatus to be operated to discriminate between a state in which the remote control devices are combined and a state in which the remote control devices are separated, as the above-described remote control apparatus for controlling the display apparatus.

Figure 10:
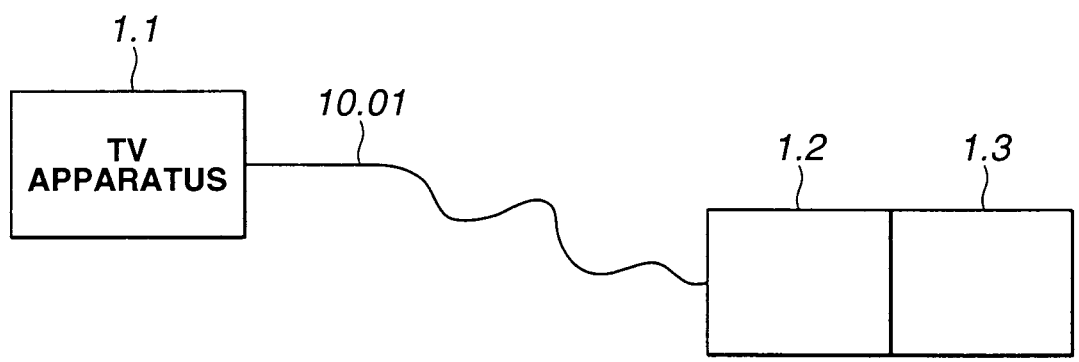
FIG. 10 is a diagram illustrating a state in which a display apparatus and a remote control apparatus are connected by a wire.

At least part of a plurality of remote control devices (a parent remote control device and a child remote control device) constituting a remote control apparatus may be connected to an object to be controlled (for example, a display apparatus) by wires. FIG. 10 is a diagram illustrating a state in which remote control devices are connected to a television apparatus by a wire 10.01. It is unnecessary to connect all the remote control devices to the controlled apparatus by wires. For example, a configuration may be adopted in which a parent remote control device 1.2 is connected by a wire, and a child remote control device 1.3 performs radio communication with the parent remote control device 1.2, and operations of the child remote control device 1.3 may be transmitted to a television apparatus, serving as an object to be operated, via the parent remote control device 1.2.

According to the present invention, it is possible to realize a flexible remote control operation.

The individual components shown in outline or designated by blocks in the drawings are all well known in the display apparatus and remote control apparatus arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display apparatus operated by a remote control apparatus including physically attachable and detachable first and second remote control devices that can be switched between a combined state in which the first and second remote control devices are physically attached to each other and a separated state, in which the first and second remote control devices are physically separated from each other, said display apparatus comprising:
   a display unit;
   a communication portion configured to communicate with the first and the second remote control devices, and
   a control portion configured to change the number of display picture frames displayed on said display unit in accordance with whether the first and second remote control devices are physically attached to or separated from each other.

2. A display apparatus according to claim 1, wherein said control portion increases the number of display picture frames in response to the physical separation of the first and the second remote control devices so that the first and second remote control devices change the state from the combined state to the separated state.

3. A display apparatus according to claim 1, wherein said control portion reduces the number of display picture frames in response to the physical attachment of the first and second remote control devices so that the first and second remote control devices change the state from the separated state to the combined state.

4. A display apparatus according to claim 1,
wherein each of different picture frames displayed on said display unit is controlled in accordance with operations of a corresponding one of the first and second remote control devices in the separated state.

5. A display apparatus according to claim 4, further comprising:
a transmission portion configured to transmit to one of the first and second remote control devices a voice signal corresponding to one of the picture frames controlled by operations of the one of the remote control devices.

6. A remote control apparatus for controlling a display apparatus, comprising:
a first remote control device;
and a second remote control device,
wherein the first remote control device and the second remote control device are physically attachable to and detachable from each other so as to be switched between a combined state in which the first and second remote control devices are physically attached to each other and a separated state in which the first and second remote control devices are physically separated from each other,
wherein the number of picture frames displayed on the display apparatus depends upon whether the first and second remote control devices are in the combined state or the separated state, and
wherein the first remote control device controls a first picture frame from among a plurality of picture frames displayed on the display apparatus and the second remote control device controls another picture frame from among the plurality of picture frames in the separated state.

7. A remote control apparatus according to claim 6, wherein a signal for discriminating between the combined state and the separated state is output by one or the other of the remote control devices to the display apparatus.

8. A remote control apparatus according to claim 6, wherein at least one of the first and second remote control devices includes a receiving circuit configured to receive a voice signal corresponding to one of the picture frames controlled by operations of said one of the remote control devices, output from the display apparatus.

* * * * *